(12) United States Patent
Cannon et al.

(10) Patent No.: US 7,188,787 B2
(45) Date of Patent: Mar. 13, 2007

(54) SPRAYER WITH WATER PURIFIER

(75) Inventors: William Michael Cannon, West Harrison, IN (US); John Allen Wooton, New Richmond, OH (US); Benjamin Jacob Clare, Cincinnati, OH (US); Melissa Ann Kreuzer, Fairfield, OH (US); Christopher Miles Miller, Milford, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 11 days.

(21) Appl. No.: 10/776,853

(22) Filed: Feb. 11, 2004

(65) Prior Publication Data
US 2005/0103897 A1    May 19, 2005

Related U.S. Application Data

(63) Continuation-in-part of application No. 10/713,460, filed on Nov. 14, 2003.

(51) Int. Cl.
*B05B 9/01* (2006.01)

(52) U.S. Cl. .......... 239/526; 239/443; 239/445; 239/575; 239/581.1; 239/588; 137/625.46

(58) Field of Classification Search .......... 239/525, 239/526, 588, 443, 444, 446, 447, 575, 581.1; 137/625.46; 251/297; 210/232, 236, 238, 210/251, 282, 287–289
See application file for complete search history.

(56) References Cited

U.S. PATENT DOCUMENTS

| | | | |
|---|---|---|---|
| 3,967,783 A * | 7/1976 | Halsted et al. | 239/381 |
| 4,903,897 A * | 2/1990 | Hayes | 239/394 |
| D322,838 S | 12/1991 | Hagedorn | |
| 5,722,597 A * | 3/1998 | Guo | 239/395 |
| 6,076,743 A * | 6/2000 | Fan | 239/447 |
| 6,267,303 B1 | 7/2001 | Francis | |
| 6,270,023 B1 * | 8/2001 | Farley | 239/553.3 |
| 6,367,710 B2 * | 4/2002 | Fan | 239/548 |
| 6,540,156 B2 | 4/2003 | Martin | |
| 6,896,201 B1 * | 5/2005 | Ouyoung | 239/240 |

FOREIGN PATENT DOCUMENTS

| | | |
|---|---|---|
| GB | 2 100 204 A | 12/1982 |
| WO | WO 03/022447 | 3/2003 |

* cited by examiner

*Primary Examiner*—Steven J. Ganey
(74) *Attorney, Agent, or Firm*—Michael J. Sambrook; Mark A. Charles; Jeffrey V. Bamber

(57) ABSTRACT

A sprayer with a water purifier, a valve system, and a selector switch for the same are disclosed. In one non-limiting embodiment, when the sprayer is in use, the sprayer includes a purifier for purifying water. The sprayer may be compact and ergonomic. The sprayer may include a valve system that provides a selection of water flow paths and/or nozzles or other output mechanisms for the sprayer, and a selector switch for controlling the valve system. In certain embodiments, the sprayer is provided with a multiple position selector switch that can be controlled by one of the operator's fingers, or by the operator's thumb so that the operator can use the sprayer and select the sprayer setting with one hand.

2 Claims, 4 Drawing Sheets

SPRAYER WITH WATER PURIFIER

CROSS REFERENCE TO RELATED APPLICATIONS

This application is a continuation-in-part of U.S. patent application Ser. No. 10/713,460 filed on Nov. 14, 2003.

FIELD OF THE INVENTION

The present invention relates to a sprayer with a water purifier, and to a valve system and a selector switch for the same.

BACKGROUND OF THE INVENTION

Sprayers of various types are known. In some cases, sprayers have a filter or other type of purifier associated therewith. The search for improved sprayers with water purifiers, and valve systems and selector switches for the same has continued.

SUMMARY OF THE INVENTION

This invention relates to a sprayer with a water purifier, and to a valve system and a selector switch for the same. There are numerous non-limiting embodiments of the present invention. It should be understood that the water purifier need not comprise part of the sprayer, particularly when the sprayer is not in use. The water purifier may be a separate component that is used with the sprayer when the sprayer is in use.

In one non-limiting embodiment, the sprayer is for spraying water and when in use comprises a purifier cartridge for purifying water. The sprayer may be compact and ergonomic. The sprayer may comprise a valve system that provides a selection of water flow paths and/or nozzles or other output mechanisms for the sprayer, and a selector switch for controlling the valve system. In certain embodiments, the sprayer is provided with a multiple position selector switch that can be controlled by one of the operator's fingers, or by the operator's thumb, so that the operator can use the sprayer and select the sprayer setting with one hand.

Numerous other embodiments are also possible, including, but not limited to those described in the following detailed description.

The present invention will become more readily apparent when considered in reference to the following description and when taken in conjunction with the accompanying drawings.

BRIEF DESCRIPTION OF THE DRAWINGS

While the specification concludes with claims particularly pointing out and distinctly claiming the subject matter which is regarded as forming the present invention, it is believed that the invention will be better understood from the following description taken in conjunction with the accompanying drawings, in which:

DETAILED DESCRIPTION OF THE INVENTION

This invention relates to a sprayer with a water purifier, and to a valve system and a selector switch for the same.

Figure 1:
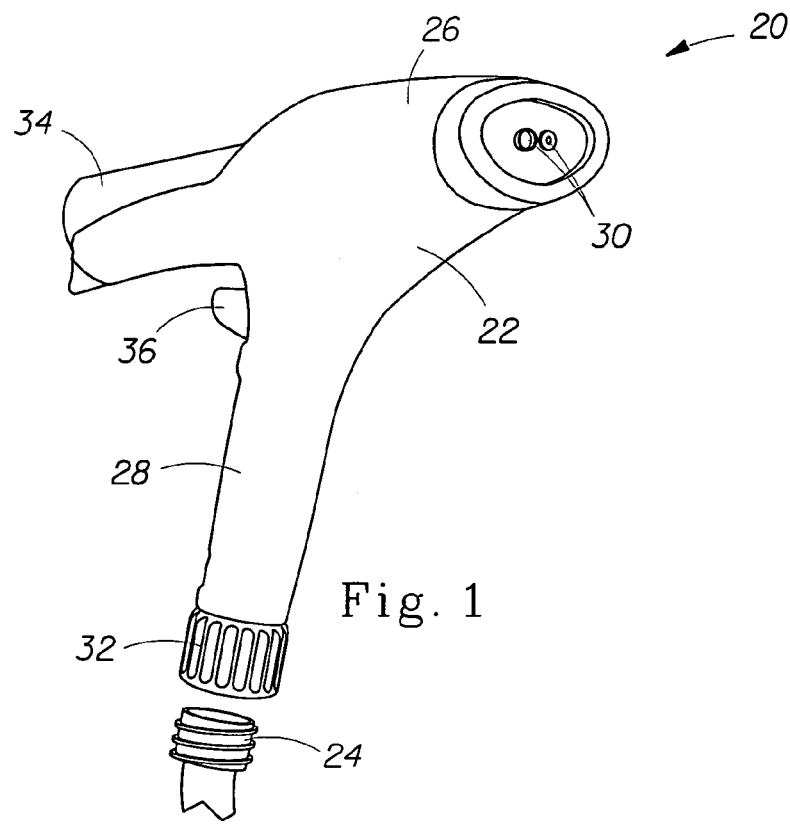
FIG. 1 is a front perspective view of one non-limiting embodiment of a sprayer with a water purifier.

FIG. 1 shows one embodiment of a sprayer 20 with a purifier. This sprayer 20 is an ergonomically-designed, hand-held hose end sprayer. It should be understood that the sprayer 20 shown in FIG. 1 has a unique configuration, and that the purifier, the valve system, and selector switch are not limited to use with a sprayer having such a configuration. The purifier, the valve system, and selector switch can be used with sprayers having any suitable configuration.

The sprayer 20 comprises a housing or structure 22. Preferably, in the embodiment shown, water flows through the housing 22 when the sprayer 20 is connected to a hose 24 and is in use. The housing 22 comprises a barrel portion 26 and a handle 28 for gripping by a user that is disposed at an angle to the barrel portion 26. The sprayer 20 further comprises at least one spray nozzle 30 that is operatively connected to the housing 22, and a hose connection (or simply "connection") 32 for the hose 24. The sprayer 20 also comprises purifier, such as purifier cartridge 34, and a selector switch 36.

Figure 2:
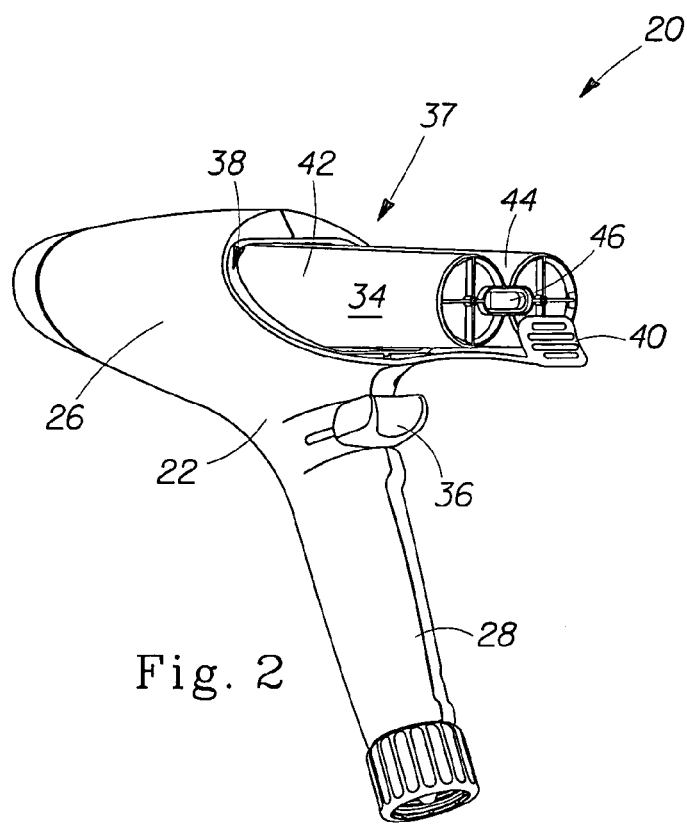
FIG. 2 is a rear perspective view of the sprayer shown in FIG. 1.

FIG. 2 shows that in this embodiment, the sprayer 20 comprises an opening 37 in a portion of the sprayer 20, such as in the rear 38 of the barrel portion 26 of the sprayer 20, for a purifer, such as purifier cartridge 34. The purifier 34 can be removeable so that it need not comprise part of the sprayer 20 when the sprayer is not in use. The sprayer 20 can comprise any suitable receiving structure for the purifier cartridge 34 into which the purifier cartridge 34 fits. One non-limiting embodiment of a receiving structure for the purifier cartridge is described in U.S. patent application Ser. No. 10/713,460 filed on Nov. 14, 2003.

The sprayer housing 22 may also have a element, such as a clip 40 for retaining the purifier cartridge in place. The clip 40 can comprise an element that is joined to the housing, or it can comprise a portion of the housing 22. In other embodiments, the purifier 34 can reside entirely inside the sprayer housing, in which case a door may cover the purifier 34, and the clip may not be necessary. It should be understood, however, that in other embodiments the sprayer 20 need not include an opening therein for the purifier cartridge 34. In such other embodiments, the purifier cartridge 34 may reside at least partially, or entirely, outside of the sprayer 20. In still other embodiments, the sprayer 20 need not comprise a purifier at all.

FIGS. 1 and 2 show one non-limiting embodiment of a purifier cartridge 34. The purifier cartridge 34 can be in any suitable configuration. The purifier cartridge 34 in the embodiment shown in the drawings is generally comprised of two side-by-side compartments. The compartments comprise cylindrical portions, and the cartridge 34 is more specifically is in the form of a structure comprised of two cylindrical portions 42 and 44 that are aligned along their axes and joined together to form a compound cylindrical structure with a cross-section that resembles the figure "8". In this particular embodiment, the cartridge has inlet and outlet openings that are both located on the same end of the purifier cartridge, the end inserted into the sprayer housing 22. When the purifier cartridge 34 is in use, water flows in the inlet opening into first cylindrical portion 42. Water then flows from the first cylindrical portion 42 through a channel 46 connecting the first and second cylindrical portions, to the second cylindrical portion 44. Water exits the purifier cartridge 34 at the outlet opening into a purified rinse spray conduit.

The purifier cartridge 34 can be permanent or replaceable. The purifier cartridge 34 can be inserted into and removed from the sprayer housing 22 through the opening 37 in the rear 38 of the barrel portion 26 of the sprayer 20. The purifier cartridge 34 can comprise any suitable type of purifying material. In one non-limiting embodiment, the purifier cartridge 34 comprises an ion exchange resin medium. The ion exchange resin medium may have any of the properties described in U.S. Pat. No. 6,562,142 B2 issued to Barger, et al.

Figure 3:
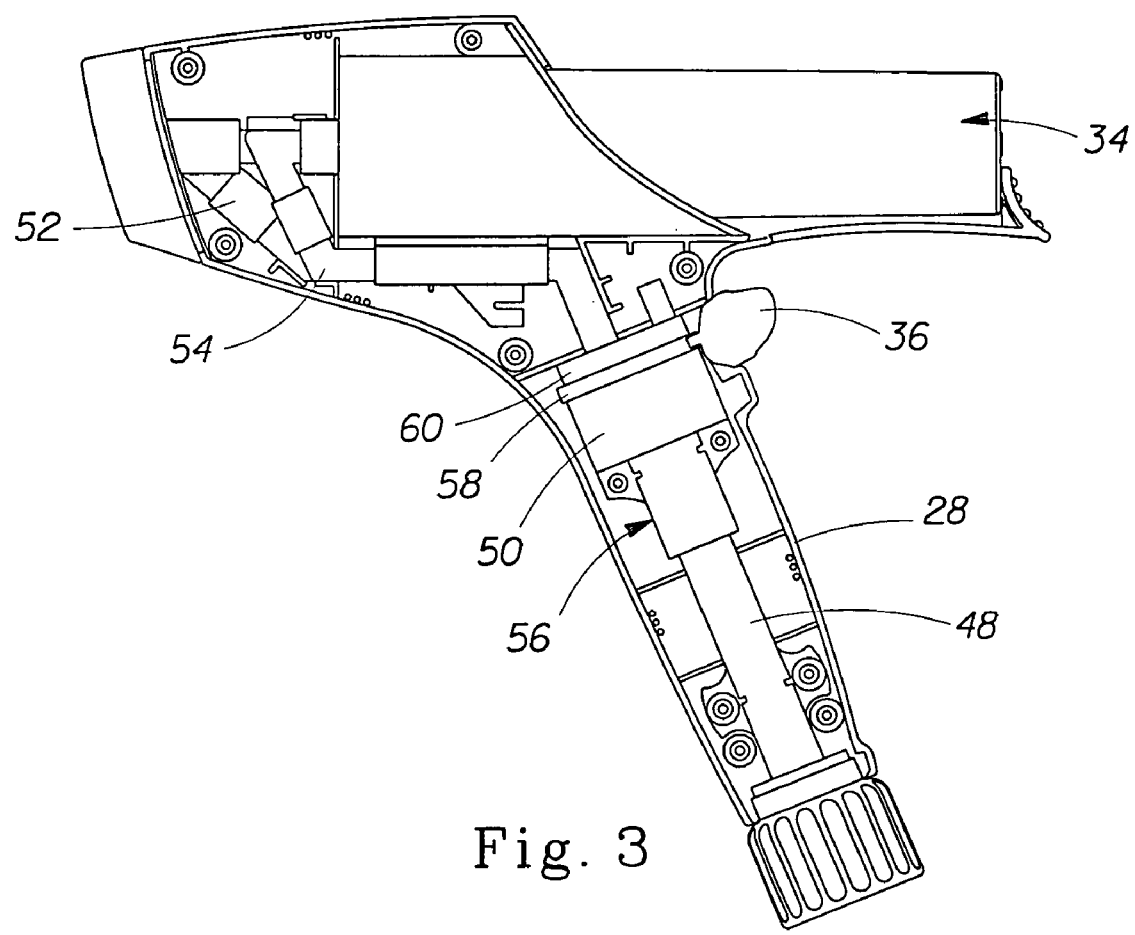
FIG. 3 is a side view of the sprayer shown in FIG. 1 shown with a portion of the housing cut away to show the internal components of the sprayer.
Figure 4:
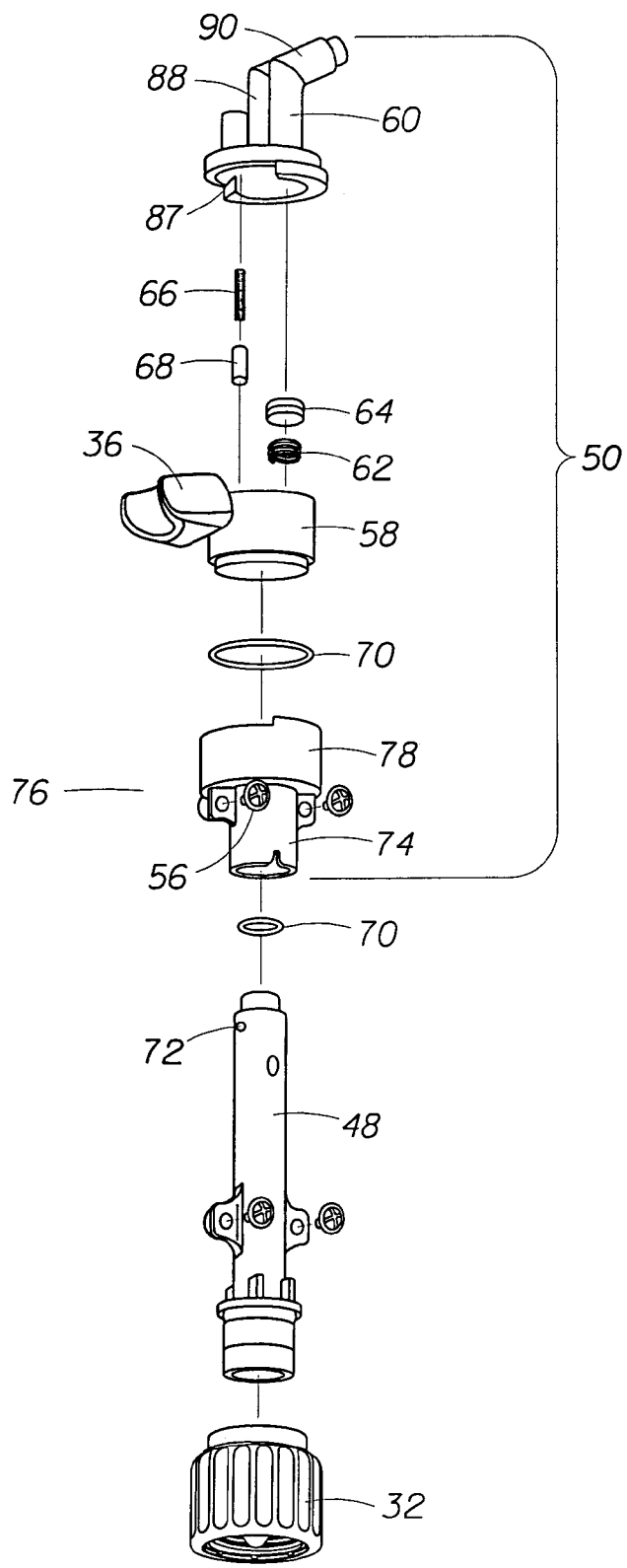
FIG. 4 is an exploded perspective view of the components of one non-limiting embodiment of the valve system.

FIG. 3 shows the internal components of the sprayer 20. In the non-limiting embodiment shown, these components comprise: an inlet tube 48, a valve system or valve 50, the selector switch 36, a rinse conduit 52, and a purifier conduit 54. FIG. 4 shows that the valve 50 comprises: a bottom valve component 56, an inner valve component 58, a top valve component 60, a selector spring 62, a selector inner seal 64, a click spring 66, and a click pin 68. The valve 50 may further comprise O-rings 70 as well as other components.

As shown in FIGS. 3 and 4, the top portion 72 of the inlet tube 48 fits into a cylindrical extension 74 on the underside of the bottom valve component 56. The upper portion 76 of the bottom valve component 56 comprises a cylindrical portion 78. The inner valve component 58 also has an exterior with a cylindrical configuration. A portion of the inner valve component 58 fits inside the cylindrical portion 78 of the bottom valve component 56. In the embodiment shown, the selector switch 36 is joined to the exterior of the inner valve component 58 and extends outward therefrom. In the embodiment shown, the selector switch 36 extends outward from the inner valve component 58 in a direction that is generally perpendicular to the axis of the cylindrical inner valve component 58.

Figure 5:
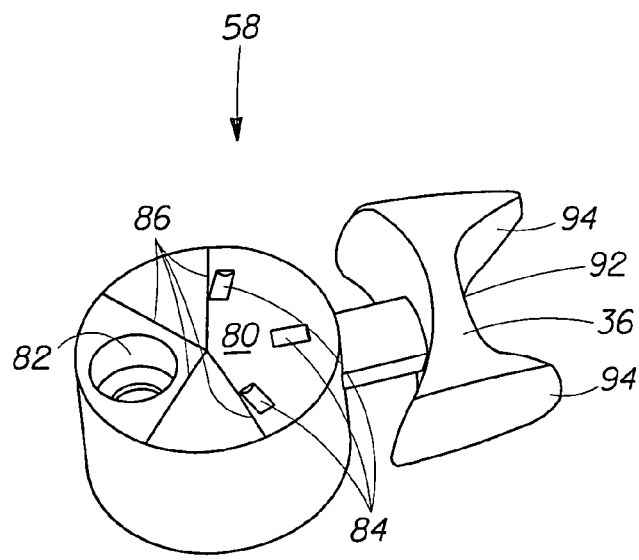
FIG. 5 is a perspective view showing the top of the inner valve component and the selector switch.
Figure 6:
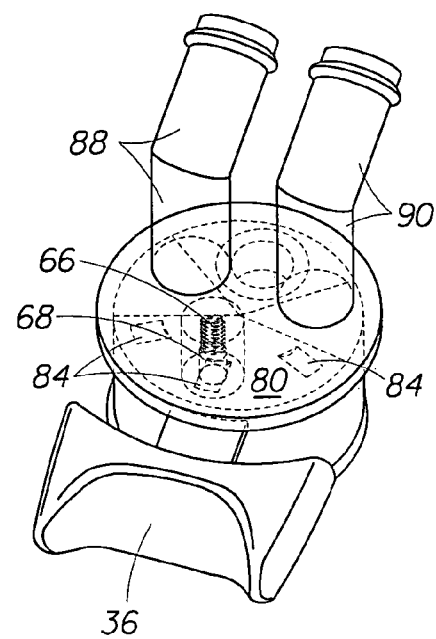
FIG. 6 is a perspective view showing the top of the inner valve component and the selector switch from another angle with the same positioned in an "off" setting.
Figure 7:
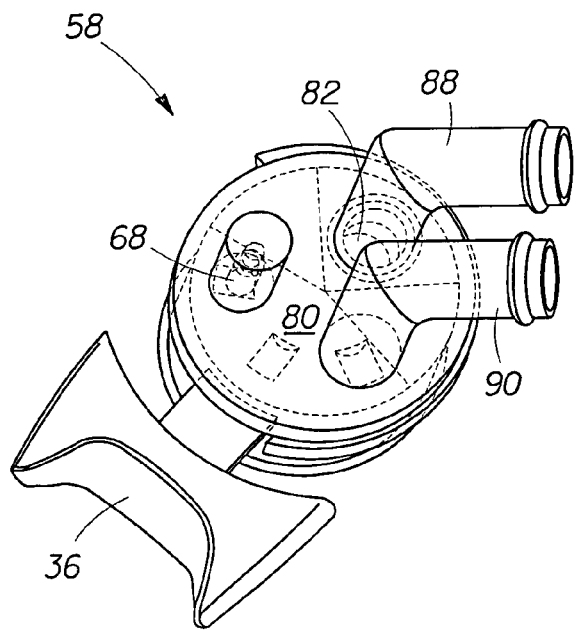
FIG. 7 is a perspective view showing the top of the inner valve component and the selector switch from another angle with the same positioned in a setting on one of the flow functions.

As shown in FIG. 5, the inner valve component 58 has a top surface 80 with an opening 82 therein, and several depressions 84 therein. The opening 82 permits water from the hose to flow through the valve 50. As shown in FIGS. 4, 6, and 7, the selector inner seal 64 sits on top of the selector spring 62, and fits at least partially into the opening 82 in the top surface 80 of the inner valve component 58. The top surface 80 of the inner valve component 58 may also comprise one or more seals 86. The seals 86 can be of any suitable configuration. In the embodiment shown, the seals 86 are in the form of raised ribs that radiate outward from the center of the top surface 80 of the inner valve component 58. In other versions of the embodiment shown, the seals 86 can have any other suitable configuration. In still other embodiments, the seals can be located on the underside of the top valve component instead of, or in addition to, being located on the top surface 80 of the inner valve component 58.

The top valve component 60 comprises a plate 87 and a pair of inflow conduits 88 and 90. One of the inflow conduits directs incoming water that passes through the valve 50 to a conduit that by-passes the water purifier 34, and thus comprises the rinse conduit. The other inflow conduit directs incoming water that passes through the valve 50 into the water purifier 34. The purified water then flows out of the purifier in a conduit that leads to a purified rinse spray nozzle. As shown in FIG. 4, the click pin 68 fits over the click spring 66, and the click spring is inserted into the underside of the top valve component 60. The top valve component 60 then rides on top of the inner valve component 58 to complete the assembly of the valve 50.

FIG. 6 shows the selector switch 36 and valve system in the "off" position. As shown in FIG. 6, when the system is in the "off" position, the opening 82 in the top surface 80 of the inner valve component 58 is located between the inflow conduits 88 and 90 of the top valve component 60. In this position, the engagement of the seals 86 against the underside of the top valve component 60 will prevent water from flowing through the valve 50 into either of the inflow conduits 88 and 90. In addition, the click pin 68 engages into the central depression 84 on the top surface 80 of the inner valve component 58 to provide a signal to the operator that the selector switch 36 is in the "off" position.

FIG. 7 shows the selector switch 36 and the valve system turned to one side. When the selector switch 36 is turned in this manner, the opening 82 in the top surface 80 of the inner valve component 58 aligns with one of the inflow conduits 88 and 90 of the top valve component 60, and water will flow through the valve 50 into the inflow conduit. In this position, the click pin 68 engages into the depression 84 to the left of the central depression on the top surface 80 of the inner valve component 58 to provide a signal to the operator that the selector switch 36 is in a different position.

The selector switch 36, in one non-limiting embodiment, has at least two positions. In the embodiment shown, the selector switch 36 has three positions, which are from left to right: "tap water spray", "off", and "purified rinse". The multiple position selector switch 36 can be controlled by one of the operator's fingers, or by the operator's thumb, so that the operator can use the sprayer and select the sprayer setting with one hand. This will allow the operator to use their other hand for some other task, such as during a process of washing a vehicle, applying a cleaning composition to the surface of the vehicle. Alternatively, this may allow the operator to hold some article in their other hand, such as a cleaning mitt, or other cleaning implement.

The selector switch 36 can comprise any suitable type of switch. The selector switch 36 shown in FIGS. 1–7 comprises a paddle/rocker switch. This switch has a generally flat region 92 in the center that is sized to accommodate the operator's thumb, and a pair of spaced apart "paddles" 94 (see FIG. 5) that are joined at an angle to the generally flat region, and are a sufficient distance apart to create a space for the operator's thumb therebetween. The paddles 94 have an interior surface and an exterior surface. The operator can control this switch by placing their thumb in the generally flat region 92, and applying force with their thumb from the interior of the switch to the interior surface of one of the paddles 94 on either side of the switch. Alternatively, the operator can place their thumb on the outside of the switch, and apply a force with their thumb on the exterior surface of one of the paddles 94 on either side of the switch. Different embodiments of such a switch can be provided with different width (or thickness) of the paddles measured in the direction of movement of the switch to provide different "throw" distances when changing between switch positions.

Figure 8:
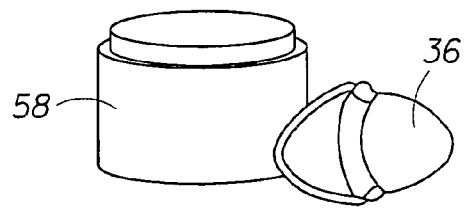
FIG. 8 is a perspective view of an alternative embodiment of a selector switch.

FIG. 8 shows an alternative embodiment of a selector switch. In FIG. 8, the selector switch 36 is a thumb switch. The operator can control this switch by applying force on either side of the switch with their thumb. Other embodiments of this switch can also be provided that have different widths to provide different "throw" distances when changing from one switch setting to another setting. In other embodiments, the selector switch 36 can have any other suitable configuration.

Numerous other embodiments are possible. A few of these are as follows. In other embodiments, for example, the sprayer could be of the type described in U.S. patent application Ser. No. 10/137,748 filed on May 2, 2002, and published as US 2003/0034051 A1 on Feb. 20, 2003, or in the configuration of the sprayer shown in U.S. Design patent application Ser. No. 29/193,107 filed on Nov. 3, 2003. In other embodiments, the valve system 50 can be located in the barrel portion 26 of the sprayer 20. In other embodiments, the components of the valve system 50 can be inverted. Therefore, the various parts of the valve system 50 that are referred to as "top" portions may be referred to as "first portions", and the various parts of the valve system 50 that are referred to as "bottom" portions may be referred to as "second portions".

The sprayer can be manufactured in any suitable manner. The housing 22 and many other components of the sprayer 20 can be made of any suitable material, such as plastic. In the embodiment shown, the housing can be comprised of two, or more pieces. The components of the sprayer 20 can be assembled inside of at least one of the pieces comprising the housing, and the pieces of the housing 22 can then be secured together.

To use the sprayer 20, the end of the purifier cartridge 34 with the inlet and outlet openings is inserted into the receiving structure located within the sprayer housing 22. The clip 40 will hold the cartridge 34 in place. After the ion exchange resin in the purifier cartridge is exhausted, the clip 40 is pressed downward and moved away from the cartridge 34, and the cartridge 34 is removed and replaced with a new cartridge.

The sprayer 20 can be used in any suitable manner or process. In one non-limiting embodiment, the sprayer 20 can be used in a process of cleaning the external surface of a vehicle, such as a car. The process can include any suitable number of steps in any suitable order. In one such embodiment, the process includes a step of applying a cleaning composition to the external surface of the vehicle. Any suitable cleaning composition can be used, and the cleaning composition can be applied to the surface of the vehicle in any manner.

In one version of such an embodiment, the cleaning composition comprises a polymer that renders the surface of the vehicle hydrophilic. One suitable polymer is described in U.S. Pat. No. 6,593,288 B2 issued to Aubay, et al. on Jul. 15, 2003. A suitable cleaning composition is described in U.S. Patent Application Publication No. US 2002/01600224 A1, published in the name of Barger, et al. on Oct. 31, 2002. In one version of such an embodiment, the cleaning composition can be applied directly to the surface of the vehicle. In another version of such an embodiment, the cleaning composition can be applied by diluting a concentrated cleaning composition with water, such as in a bucket of water, and then applying the diluted cleaning composition to the surface of the vehicle. The cleaning composition can be applied to the surface of the vehicle in any suitable manner such as by pouring, or spraying the cleaning composition on the surface of the vehicle, or by using any suitable type of applicator (such as a sponge, a wash mitt, etc.) to apply the cleaning composition to the surface of the vehicle.

The sprayer 20 can then be set to the rinse setting and used to rinse off the cleaning composition. Following this, the sprayer 20 can be set to the purified rinse setting, and the surface of the vehicle can be rinsed with purified rinse water to remove any residue-forming substances that remain on the surface of the vehicle.

The disclosure of all patents, patent applications (and any patents which issue thereon, as well as any corresponding published foreign patent applications), and publications mentioned throughout this description are hereby incorporated by reference herein. It is expressly not admitted, however, that any of the documents incorporated by reference herein teach or disclose the present invention.

While particular embodiments of the subject invention have been described, it will be obvious to those skilled in the art that various changes and modifications of the subject invention can be made without departing from the spirit and scope of the invention. In addition, while the present invention has been described in connection with certain specific embodiments thereof, it is to be understood that this is by way of illustration and not by way of limitation and the scope of the invention is defined by the appended claims which should be construed as broadly as the prior art will permit.

What is claimed is:

1. A sprayer comprising:
   (a) a housing comprising a handle portion for gripping in an operator's hand;
   (b) a purifier cartridge for purifying water;
   (c) a valve system within the handle portion of said housing, said valve system having a configuration that provides a combination of an off function and one or more spray functions, wherein said valve system comprises:
      (i) a bottom valve component;
      (ii) a top valve component disposed above said bottom valve component, said top valve component having an underside and comprising a plate and at least two inflow conduits attached to said plate; and
      (iii) an inner valve component positioned between said bottom valve component and said top valve component, said inner valve component having a top surface and having an opening therein, wherein said inner valve component is rotatable relative to said bottom valve component and said top valve component, wherein at least one of the underside of said top valve component and said top surface of said inner valve component have a seal thereon;
      wherein at least one of said inflow conduits of said top valve component, when selectively aligned to be in fluid communication with said opening of said inner valve component directs water passing through said valve system into said purifier cartridge, and wherein at least one other of said inflow conduits of said top valve component, when selectively aligned to be in fluid communication with said opening of said inner valve component, directs water passing through said valve system to by-pass said purifier cartridge; and
   (d) a selector switch operatively connected to said valve system, said selector switch having positions to both turn said sprayer off, and to set said valve system to said one or more spray functions.

2. A sprayer comprising:

(a) a housing comprising a handle portion for gripping in an operator's hand between the operator's palm and fingers;

(b) a purifier cartridge for purifying water;

(c) a valve system within said housing, said valve system having a configuration that provides two or more spray functions, wherein at least one of said two or more spray functions is a purified rinse function resulting from water being passed through said valve system and directed into said purifier cartridge, and wherein at least one other of said two or more spray functions is a tap water function resulting from water being passed through said valve system and by-passing said purifier cartridge; and (d) a selector switch operatively connected to said valve system, said selector switch having positions corresponding to each of said two or more spray functions, wherein said selector switch is located above at least a portion of said handle portion a distance from the portion of said handle portion that fits in the operator's fingers, wherein said distance is within a range sufficient to permit the operator to move said selector switch with the operator's thumb of the same hand that is holding said sprayer by said handle portion.

* * * * *